(12) United States Patent
Kuragaya et al.

(10) Patent No.: US 11,992,891 B2
(45) Date of Patent: May 28, 2024

(54) MACHINING METHOD OF WIRE DISCHARGE MACHINE, MACHINING PROGRAM GENERATING DEVICE, WIRE DISCHARGE MACHINING SYSTEM AND MACHINED OBJECT MANUFACTURING METHOD

(71) Applicant: Sodick Co., Ltd., Kanagawa (JP)

(72) Inventors: Tsubasa Kuragaya, Kanagawa (JP); Masashi Sakaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 355 days.

(21) Appl. No.: 17/537,454

(22) Filed: Nov. 29, 2021

(65) Prior Publication Data

US 2022/0176481 A1   Jun. 9, 2022

(30) Foreign Application Priority Data

Dec. 9, 2020  (JP) .................................. 2020-204071
Apr. 27, 2021 (JP) .................................. 2021-074768

(51) Int. Cl.
*B23H 7/06* (2006.01)
*B23H 7/10* (2006.01)
*B23H 7/20* (2006.01)

(52) U.S. Cl.
CPC ............ *B23H 7/065* (2013.01); *B23H 7/105* (2013.01); *B23H 7/20* (2013.01); *B23H 2600/12* (2013.01); *G05B 2219/45043* (2013.01)

(58) Field of Classification Search
CPC .......... B23H 7/10; B23H 7/102; B23H 7/065; B32H 7/20; B32H 2600/12; G05B 2219/45043
See application file for complete search history.

(56) References Cited

U.S. PATENT DOCUMENTS

| | | | | |
|---|---|---|---|---|
| 5,242,555 A | * | 9/1993 | Buhler | ..................... B23H 7/06 204/297.06 |
| 5,253,178 A | | 10/1993 | Nakayama | |
| 2020/0114444 A1 | | 4/2020 | Sakaguchi | |

FOREIGN PATENT DOCUMENTS

| | | | |
|---|---|---|---|
| EP | 0692333 | 1/1996 | |
| JP | H02167621 | 6/1990 | |
| JP | H0346246 | 7/1991 | |
| JP | H05-002823 | 1/1993 | |
| JP | H05329713 | 12/1993 | |
| JP | H0825145 | 1/1996 | |
| JP | 2013144335 | 7/2013 | |
| JP | 5813517 | 11/2015 | |
| JP | 6599532 | 10/2019 | |
| JP | 2019181637 | 10/2019 | |
| WO | WO-2013161082 A1 * | 10/2013 | ............... B23H 1/02 |

* cited by examiner

*Primary Examiner* — Geoffrey S Evans
(74) *Attorney, Agent, or Firm* — JCIPRNET

(57) ABSTRACT

The disclosure provides a machining program generating device of a wire discharge machine, a machining program generating method, a wire discharge machining system and a machined object manufacturing method. The machining method of the wire discharge machine of the disclosure includes: a processing of forming and machining a claw part on at least one of a machining path of a machining groove and a machining path of a dividing line for dividing a core that forms an inner part of a workpiece separated by the machining groove; and a processing of separating the core from the workpiece by dividing at the dividing line.

5 Claims, 14 Drawing Sheets

MACHINING METHOD OF WIRE DISCHARGE MACHINE, MACHINING PROGRAM GENERATING DEVICE, WIRE DISCHARGE MACHINING SYSTEM AND MACHINED OBJECT MANUFACTURING METHOD

CROSS-REFERENCE TO RELATED APPLICATION

This application claims the priority benefit of Japan application serial no. 2020-204071, filed on Dec. 9, 2020, and Japan application serial no. 2021-074768, filed on Apr. 27, 2021. The entirety of each the above-mentioned patent applications is hereby incorporated by reference herein and made a part of this specification.

BACKGROUND

Technical Field

The disclosure relates to a machining method of a wire discharge machine, a machining program generating device, a wire discharge machining system and a machined object manufacturing method capable of preventing divided cores from falling.

Description of Related Art

Wire discharge machining is widely known in which discharge machining is performed by generating discharge between the poles formed between the machining electrode and the workpiece, and is applied to jigsaw-shaped cutting with wire electrodes on a workpiece such as a plate. In such wire discharge machining, since it is necessary to collect the core which is the inner part of the workpiece separated by the machining groove during machining, a method of sucking the core and lifting it upward to take it out (Patent Document 1), a method of pressing the core from above to collect it (Patent Document 2), a method of taking out the core by cutting at the end the portion left uncut or the portion where the core and the workpiece are adhered to prevent falling (Patent Document 3 and Patent Document 6) or the like is used.

In the above-mentioned collection methods, when the weight or volume of the core cut out from the workpiece is large, it is difficult to lift or press the core well with a removing device or the like, and there is a problem that the core cannot be properly collected from the workpiece. Therefore, a method is used in which a core having a large weight or volume is divided into a plurality of pieces in advance, and the divided cores are removed in order (Patent Documents 4 and 5).

RELATED ART

Patent Document

[Patent Document 1] Japanese Patent No. 6599532
[Patent Document 2] Japanese Laid-open No. 2019-181637
[Patent Document 3] Japanese Laid-open No. H08-025145
[Patent Document 4] Japanese Laid-open No. H05-002823
[Patent Document 5] Japanese Laid-open No. H02-167621
[Patent Document 6] Japanese Patent No. 5813517

SUMMARY

Technical Problem

However, when the divided cores are removed in order, unremoved cores move inside the machining groove due to the jet of the machining fluid or the like, and enter the space created by other cores being removed from the workpiece. If the unremoved cores move freely inside the machining groove, there is a problem that the wire electrode is sandwiched between the cores or between the core and the workpiece, which causes disconnection. Further, there is a problem that the cores cannot be properly removed by a collection device or the like because the position of the unremoved cores are displaced.

In view of the above problems, the disclosure provides a machining program generating device of a wire discharge machine, a machining program generating method, a wire discharge machining system and a machined object manufacturing method capable of properly collecting a core even when the core is divided.

Solution to the Problem

The disclosure provides a machining method of a wire discharge machine, including: a processing of forming and machining a claw part on at least one of a machining path of a machining groove and a machining path of a dividing line for dividing a core that forms an inner part of a workpiece separated by the machining groove; and a processing of separating the core from the workpiece by dividing at the dividing line.

According to the machining method of the disclosure, the claw part is formed and machined on at least one of the machining path of the machining groove and the machining path of the dividing line for dividing the core. Therefore, even when the core is divided, the movement of the core can be prevented, and the wire electrode can be prevented from being disconnected, and the core can be appropriately removed by a simple method.

The machining method of the wire discharge machine of the disclosure includes: a first machining processing of machining the machining groove with an uncut part left so as not to separate the core from the workpiece; a second machining processing of dividing at the dividing line and separating the core from the workpiece in order; and a third machining processing of separating the uncut part.

If wire discharge machining is performed on the workpiece while dividing the core into multiple pieces and removing them, the jet of the machining fluid goes into the space created by collecting the divided cores from the workpiece, and there is problem that the machining fluid is not properly supplied to the machining gap between the workpiece and the remaining part of the core during wire discharge machining. If the jet of the machining fluid is not jetted into the machining gap, there is a problem that the machining waste is clogged in the machining gap and the insulation state between the wire electrode and the workpiece is deteriorated, and the finishing accuracy of the machined surface on the workpiece side is lowered.

According to the disclosure, since the first machining processing for machining the machining groove without separating the core from the workpiece is performed first and then the second machining processing for separating the core in order is performed afterwards, it is possible to solve the problem that the jet of the machining fluid goes into the space created by collecting the core divided from the workpiece and the problem that the jet of the machining fluid is not jetted into the machining gap.

In the machining method of the wire discharge machine of the disclosure, the first machining processing forms the claw part for the divided core not to move inside the machining groove on the machining path of the machining groove and machines the claw part and the machining groove.

Further, the machining method of the wire discharge machine of the disclosure further includes a fourth machining processing of removing the claw part from the workpiece after the third machining processing.

According to the disclosure, since the first machining processing includes a processing of providing the claw part on the machining path of the machining groove, even when the machining groove is machined with the uncut part left, the core is fixed to the workpiece by the claw part, and it is possible to solve problems such as the core tilting inside the machining groove and coming into contact with the workpiece.

Further, according to the disclosure, since the claw part can be removed from the workpiece after the third machining processing, the claw part can be automatically added and removed, which does not affect the shape of the final product.

In the machining method of the wire discharge machine of the disclosure, the second machining processing forms the claw part for the divided core not to move inside the machining groove on the machining path of the dividing line for dividing the core and machines the claw part and the dividing line.

According to the disclosure, since the second machining processing includes a processing of providing the claw part on the machining path of the dividing line, the divided core is properly fixed inside the machining groove. Therefore, it is possible to solve the problem that the core moves inside the machining groove before being collected and the problem that the core cannot be collected properly.

In the specification of the disclosure, the "machining groove" is the contour of a product (machined object) formed on a workpiece by machining with a wire discharge machine. Further, the "core" is an inner part of the workpiece separated from the machining groove of the workpiece by machining with a wire discharge machine. The "machining program" is a program programmed in the NC language, which includes the discharge machining conditions of the wire discharge machine and the movement command of the wire electrodes. Further, the "machining path" is a path defined by the machining program, and is a line of the wire electrode when it is actually moved. Further, the "uncut part" is a part on the machining path of the machining groove and is not separated by the wire electrode during roughing machining. The "machining shape data" is CAD data indicating the shape of the machining groove.

Effects

According to the disclosure, it is possible to automatically and reliably remove the divided cores during machining, and it is possible to resolve problems such as disconnection of the wire electrode due to the movement of the uncollected cores and the inability to properly collect the cores. Further, according to the disclosure, even when the core is divided, the machining liquid can be properly supplied to the machining gap between the workpiece and the core during wire discharge machining.

DESCRIPTION OF THE EMBODIMENTS (1.1 Overall Configuration of the Wire Discharge Machining System 100)

Figure 1:
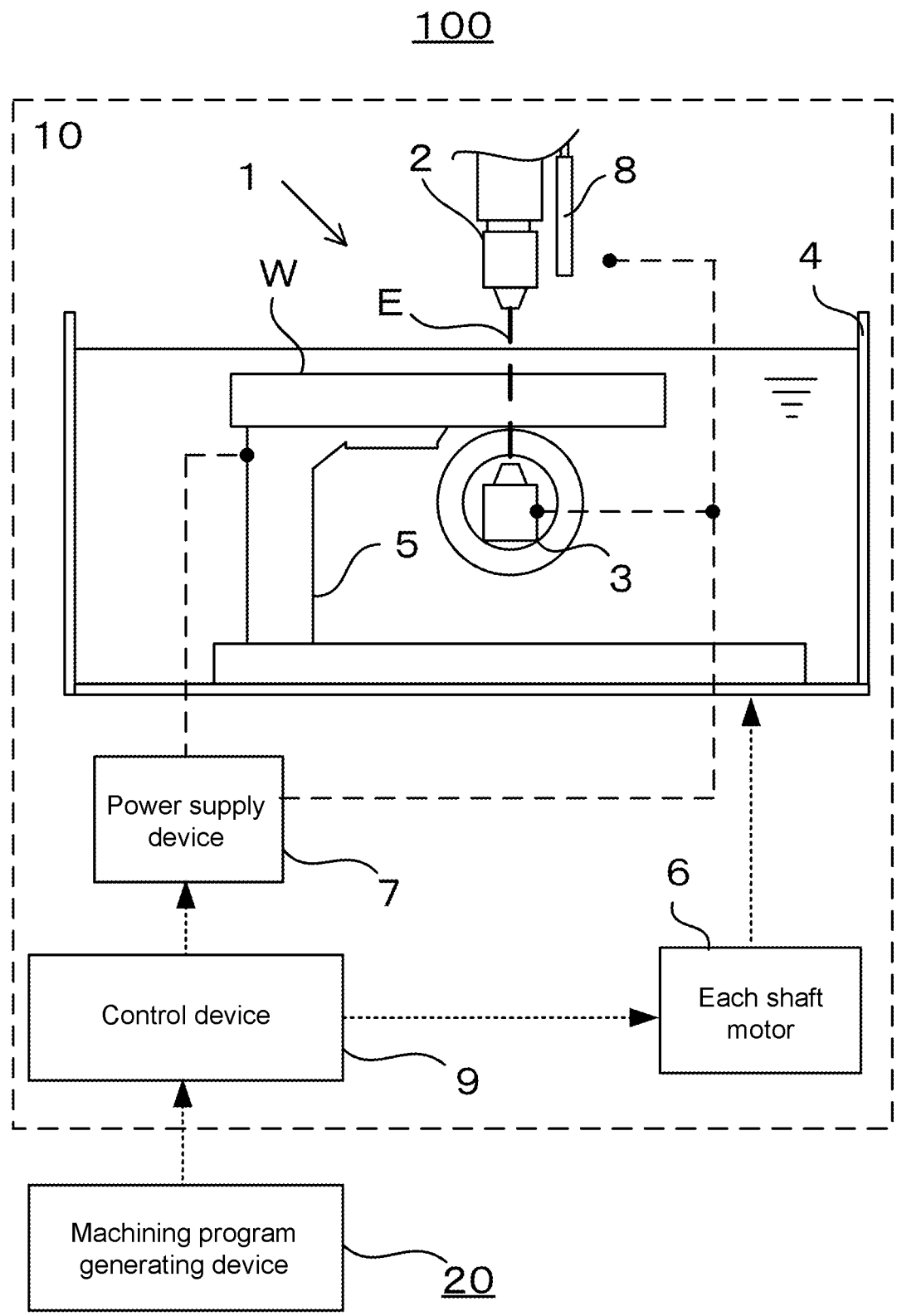
FIG. 1 is an overall configuration diagram showing a wire discharge machining system 100 of the disclosure.

Hereinafter, embodiments of the disclosure will be described in detail with reference to the drawings. FIG. 1 is an overall configuration diagram of a wire discharge machining system 100 of the disclosure. The outline is described with reference to the figure; the wire discharge machining system 100 includes a wire discharge machine 10 and a machining program generating device 20.

The wire discharge machine 10 is configured by a machine body 1, each shaft motor 6 for driving the machine body 1, a power supply device 7, and a control device 9, and the machining program generating device 20 is connected to the control device 9.

The machine body 1 is configured to continuously supply a wire electrode E as a tool electrode between an upper guide assembly 2 and a lower guide assembly 3, immerse a workpiece W in a machining fluid while it is placed on a workpiece stand 5 in a machining tank 4, perform discharge machining of the workpiece W by setting the distance between the poles of the wire electrode E and the workpiece W to a predetermined distance by each shaft motor 6, and apply a predetermined voltage between the poles to generate a discharge by the power supply device 7.

Further, the machine body 1 is provided with a core moving device 8 for collecting a core N. For example, the core moving device 8 includes a core suction holding part having a permanent magnet or the like, and by attracting the cut out core N to the core suction holding part, the core N is collected in a core collection bucket (not shown) of the machine body 1 after being taken out from the workpiece W.

Figure 2:
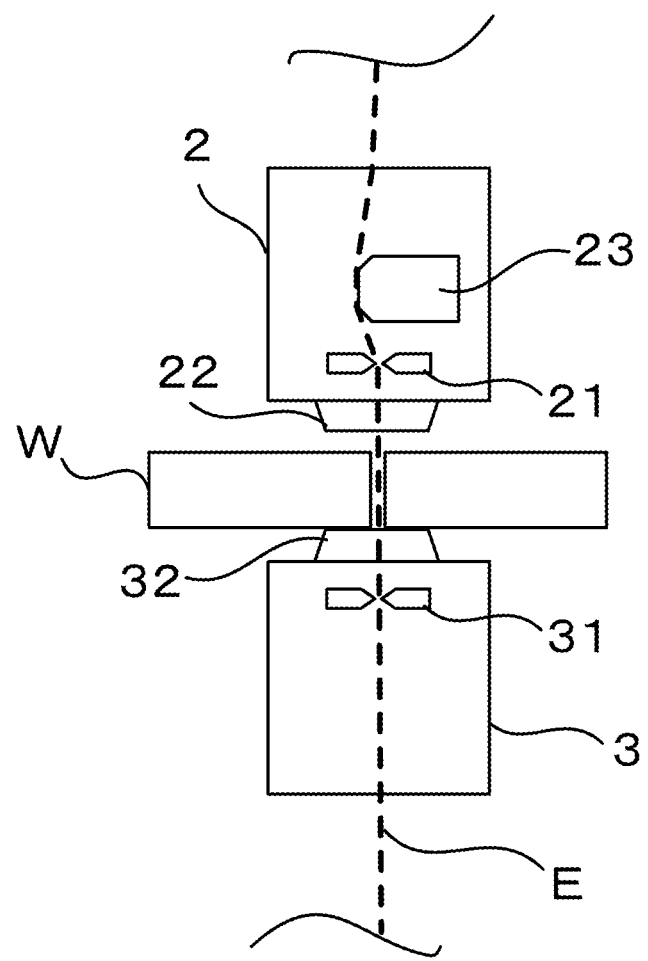
FIG. 2 is an enlarged diagram showing the upper guide assembly 2 and the lower guide assembly 3 of the above embodiment.

FIG. 2 is an enlarged diagram showing the upper guide assembly 2 and the lower guide assembly 3 of the above embodiment.

The upper guide assembly 2 is an assembly formed by integrating a wire guide 21 (guide body) that positions and guides the wire electrode E, an energizing body 23 that supplies power to the wire electrode E, and a jet nozzle 22 that supplies a jet of machining fluid coaxially downward to the wire electrode E with respect to a machining gap between the workpiece W and the core N. The lower guide assembly 3 is an assembly formed by integrating a wire guide 31 (guide body) that positions and guides the wire electrode E, and a jet nozzle 32 that supplies a jet of machining fluid coaxially upward to the wire electrode E with respect to a machining gap between the workpiece W and the core N.

The control device 9 is a device that receives a machining program 90 from the machining program generating device 20, decodes it, and transmits a control signal. That is, the wire discharge machine 10 drives each shaft motor 6 based on the control signal generated by the control device 9, and makes the wire electrode E move along a machining path specified by the machining program 90 while performing roughing machining and finishing machining of a machining groove G1.

Here, the machining program 90 gives the control device 9 a discharge machining condition, a movement command, and the like. Each drive shaft of the motor or the like is controlled so as to have a desired shape along the machining path specified by the machining program 90.

The machining program 90 is a program programmed in the NC language, and is configured by a plurality of blocks. The blocks include information necessary to execute one specific operation (movement, stop, discharge machining start, etc.), and specifically are configured by using a G code that determines the operation mode of the machine (various position determination, movement, and the like), an M code that commands an auxiliary function other than the coordinate words, movement speed and operation indicating the movement destination of each part, and the like.

Figure 3:
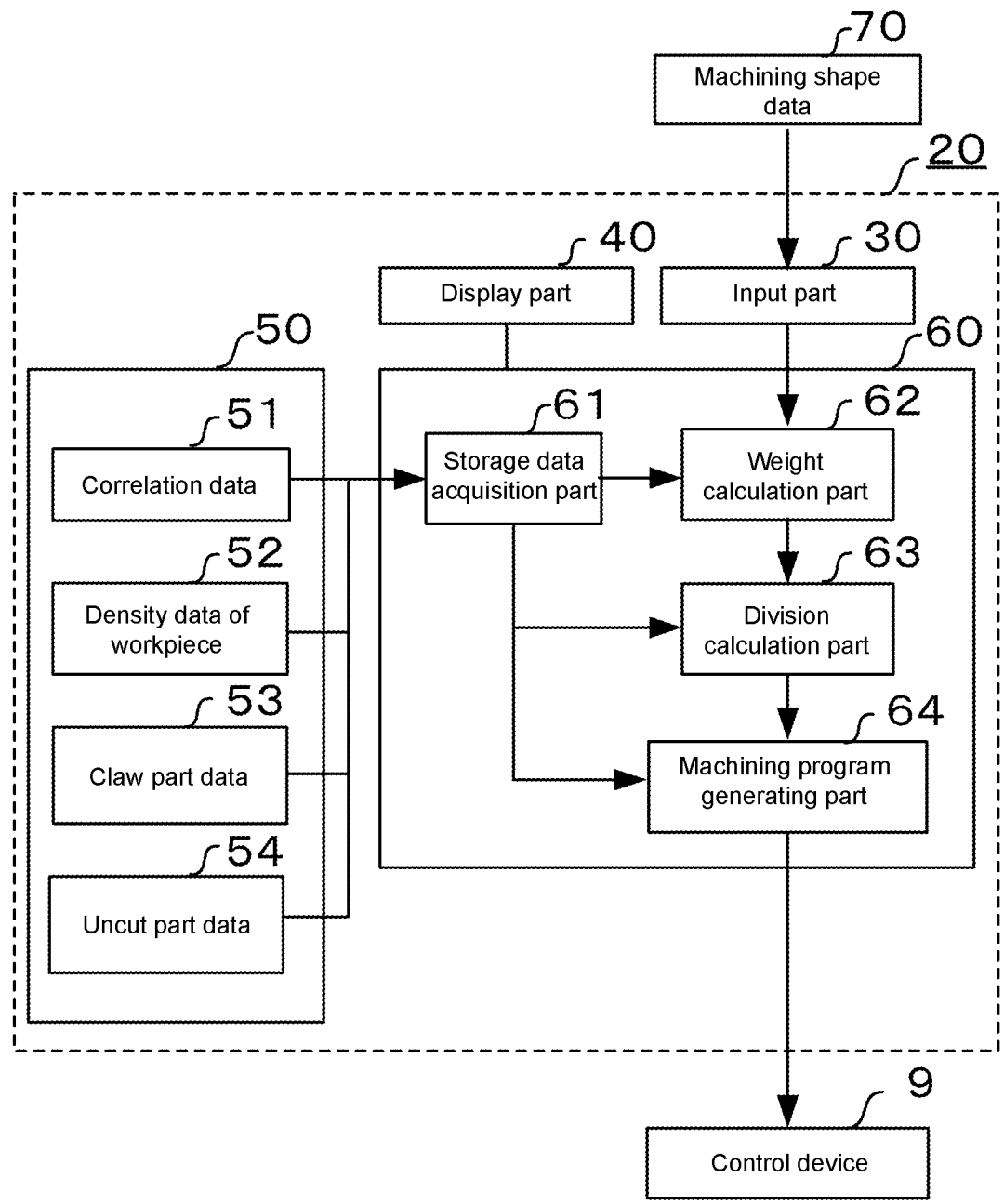
FIG. 3 is a block diagram showing a configuration of the machining program generating device 20 of the above embodiment.

FIG. 3 is a block diagram showing a configuration of the machining program generating device 20 of the above embodiment.

The machining program generating device 20 is a device that generates a machining program to be executed by the wire discharge machine 10 and transmits it to the control device 9. The machining program generating device 20 calculates the number of divisions based on the weight of the core N and generates the machining program 90 that includes movement commands of a machining path of the machining groove G1, a machining path of a dividing line for dividing the core N, and a machining path of a claw part T.

The machining program generating device 20 includes an input part 30, a display part 40, a storage part 50, and a processing part 60.

The input part 30 is configured by, for example, a keyboard, a mouse, a touch panel, or the like, and machining shape data 70, which is CAD data, is input from the input part 30 to the processing part 60. Further, the input part 30 also includes a configuration in which the machining shape data 70 is input by being connected to a device equipped with CAD software via USB and LAN.

The display part 40 is configured by a CRT display, a liquid crystal display, or the like, and displays information input from the input part 30 and information processed by the processing part 60. On the screen of the display part 40, for example, drawing information is displayed based on the machining shape data 70 of the workpiece W input by an operator via the input part 30.

Figure 4:
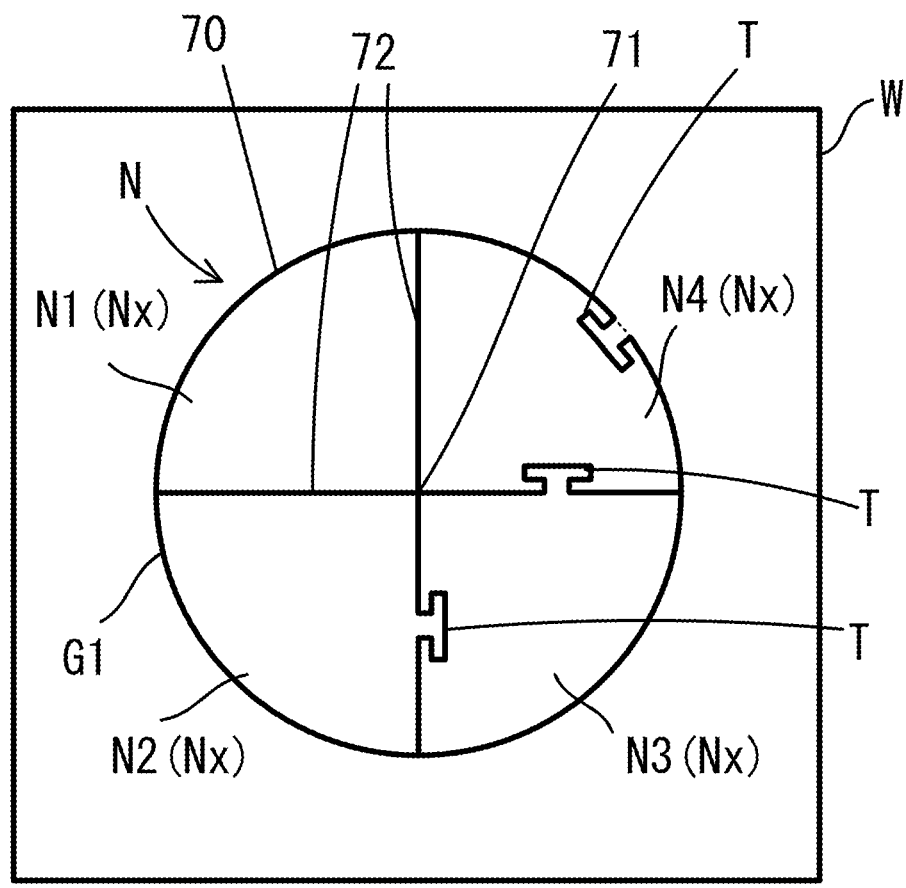
FIG. 4 is an illustrative diagram showing the shape of the claw part T formed by the wire discharge machining system 100 of the disclosure.
Figure 8:
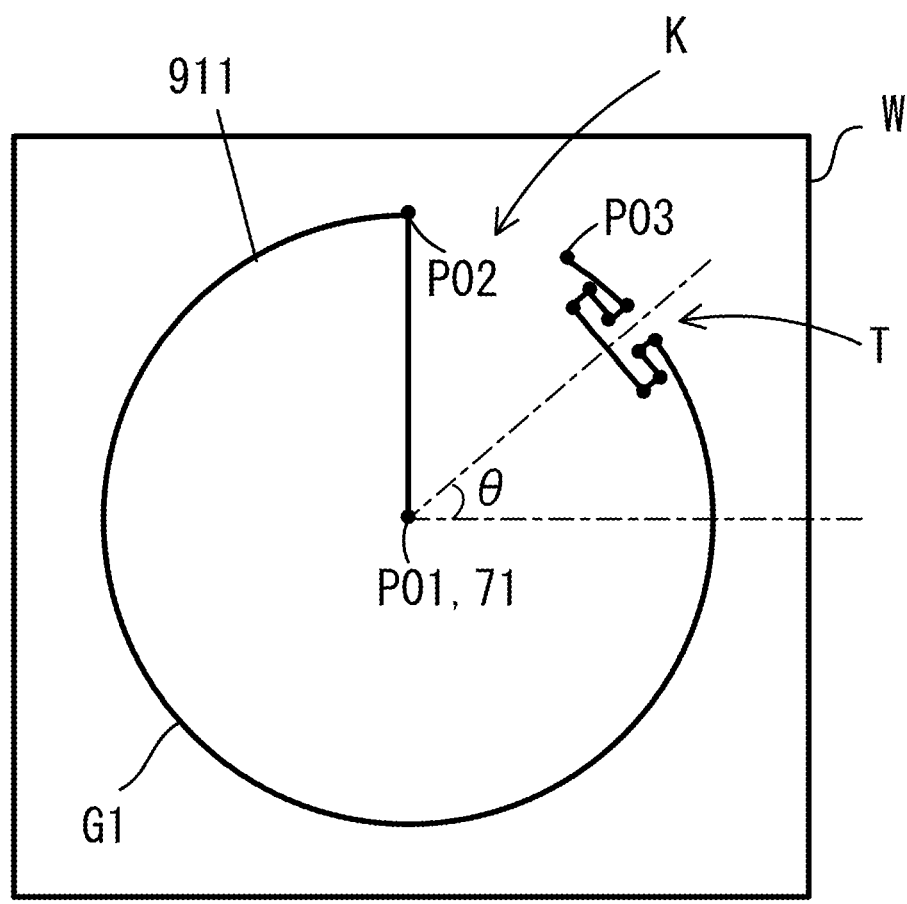
FIG. 8 is an illustrative diagram for illustrating the arrangement relationship between an uncut part K and the claw part T of the above embodiment.

FIG. 4 is an illustrative diagram showing the shape of the claw part T formed by the wire discharge machining system 100 of the disclosure, and FIG. 8 is an illustrative diagram for illustrating the arrangement relationship between an uncut part K and the claw part T of the above embodiment.

The storage part 50 is configured by a hard disk, a CD-ROM, or the like, and stores various data.

The storage part 50 stores data 51 indicating the correlation between the weight and the number of divisions of the core N, density data 52 of the workpiece W, claw part data 53, and uncut part data 54.

The data 51 indicating the correlation between the weight and the number of divisions of the core N is information indicating the optimal number of divisions of the core N with respect to the total weight of the core N. The core moving device 8 calculates in advance capability of sucking and collecting the core N based on the mechanical performance and the like, and stores it in the storage part 50.

The density data 52 of the workpiece W is the mass per unit volume of the workpiece W to be machined and is determined by the material of the workpiece W, and is therefore stored as a data table in which the material and the density are linked. Here, when the material of the workpiece W is iron or the like and there is only one material of the workpiece W to be handled, it is not necessary to store the density data 52 of the workpiece W as a data table. It is also possible to use a unit volume weight instead of using the density data 52.

Figure 11:
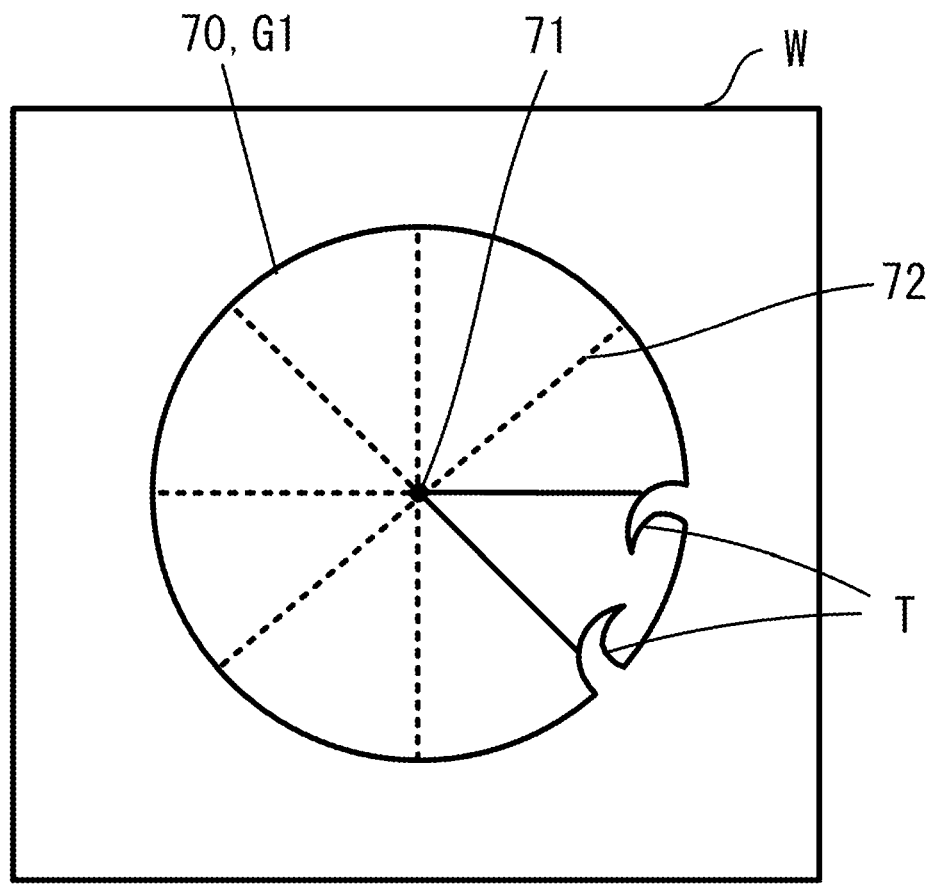
FIG. 11 is an illustrative diagram showing the shape of the claw part T formed by the wire discharge machining system 100 of the above embodiment.
Figure 12:
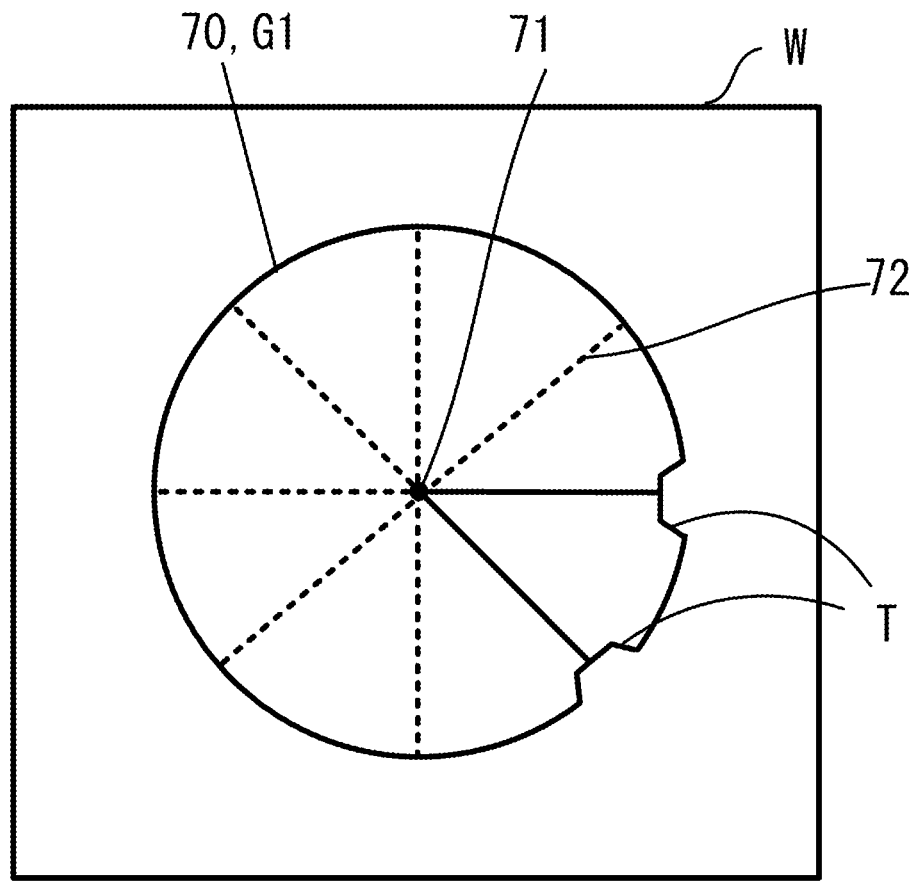
FIG. 12 is an illustrative diagram 2 showing the shape of the claw part T formed by the wire discharge machining system 100 of the above embodiment.
Figure 13:
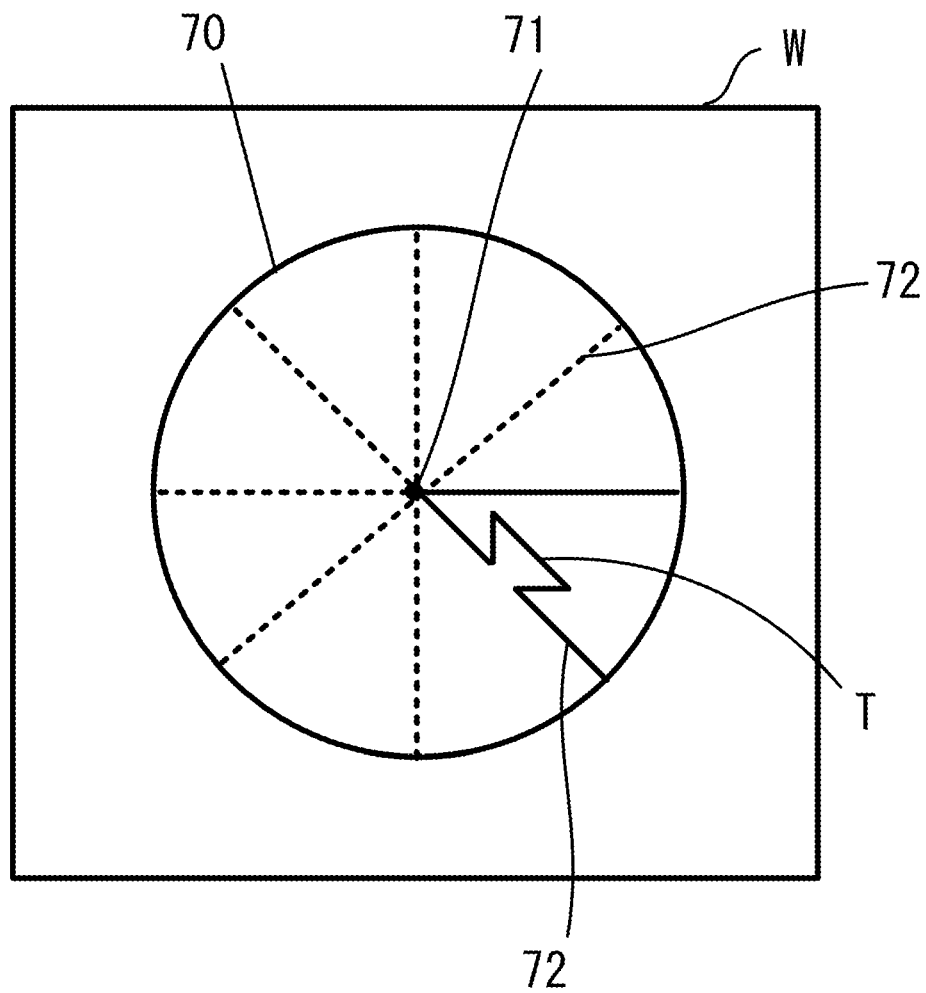
FIG. 13 is an illustrative diagram 3 showing the shape of the claw part T formed by the wire discharge machining system 100 of the above embodiment.

FIG. 11 to FIG. 13 are illustrative diagrams showing the shape of the claw part T formed by the wire discharge machining system 100 of the disclosure.

The claw part data 53 is data indicating the shape of the claw part T and data indicating a position where the claw part T is added to the machining path.

In the embodiment, the claw part T for preventing the core N from moving inside the machining groove G1 is provided on the machining path of the machining groove G1 and on the machining path of a dividing line 72 of the core N.

The data indicating the shape of the claw part T is data such as a 3D model showing the basic shape of the claw part T and a set of position coordinates, and is data indicating a triangular cross section (FIG. 13), a hook cross section (FIG. 11), a convex cross section (FIG. 4), a trapezoidal cross section (FIG. 12), and the like. The data indicating the shape of the claw part T may be a set of the basic shape of the claw part T and the dimensional information of the claw part T indicating the enlargement ratio, reduction ratio, rotation degree, and the like of the basic shape.

The data indicating the position where the claw part T is added to the machining path is, for example, data indicating that the position to be added is a position on the machining path of the dividing line 72, a position on the machining path of the machining groove G1, and the like. At least one or more claw parts T are defined to be provided at positions on the machining path of the machining groove G1 within the machining shape locus of the divided core Nx (the divided core N4 in FIG. 4) to be machined last among the divided cores Nx (x=1, 2, . . . , number of divisions) formed by dividing the core N.

The position where the claw part T is added to the machining path may be the position where the machining groove G1 and the dividing line 72 intersect.

Further, the claw part T added on the machining path of the dividing line 72 has a function of holding the divided core Nx so that the divided core Nx to be separated next moves in the direction of the space formed after at least one of the divided cores Nx is separated and does not deviate from a predetermined position. Therefore, it is possible to set the claw part data 53 so that the claw part T is not added on the machining path of the dividing line 72 of the divided core Nx (the divided core N1 in FIG. 4) to be separated first when there is no space.

Further, the claw part T added on the machining path of the machining groove G1 can be set in the claw part data 53 so that the angle θ of the line extending from the center of gravity 71 of the machining groove G1 to the center of the claw part T is provided at a position of 20° or more and 45° or less (FIG. 8) with the line extending in the horizontal direction from the center of gravity 71 of the machining groove G1 used as a reference, assuming that there is an uncut part K in the vertical direction from the center of gravity 71 of the machining groove G1. When the claw part data 53 is set in this way, even after most of the machining groove G1 is first rough machined along the first machining path 911, the core N can be machined without tilting in the machining groove G1.

Figure 5:
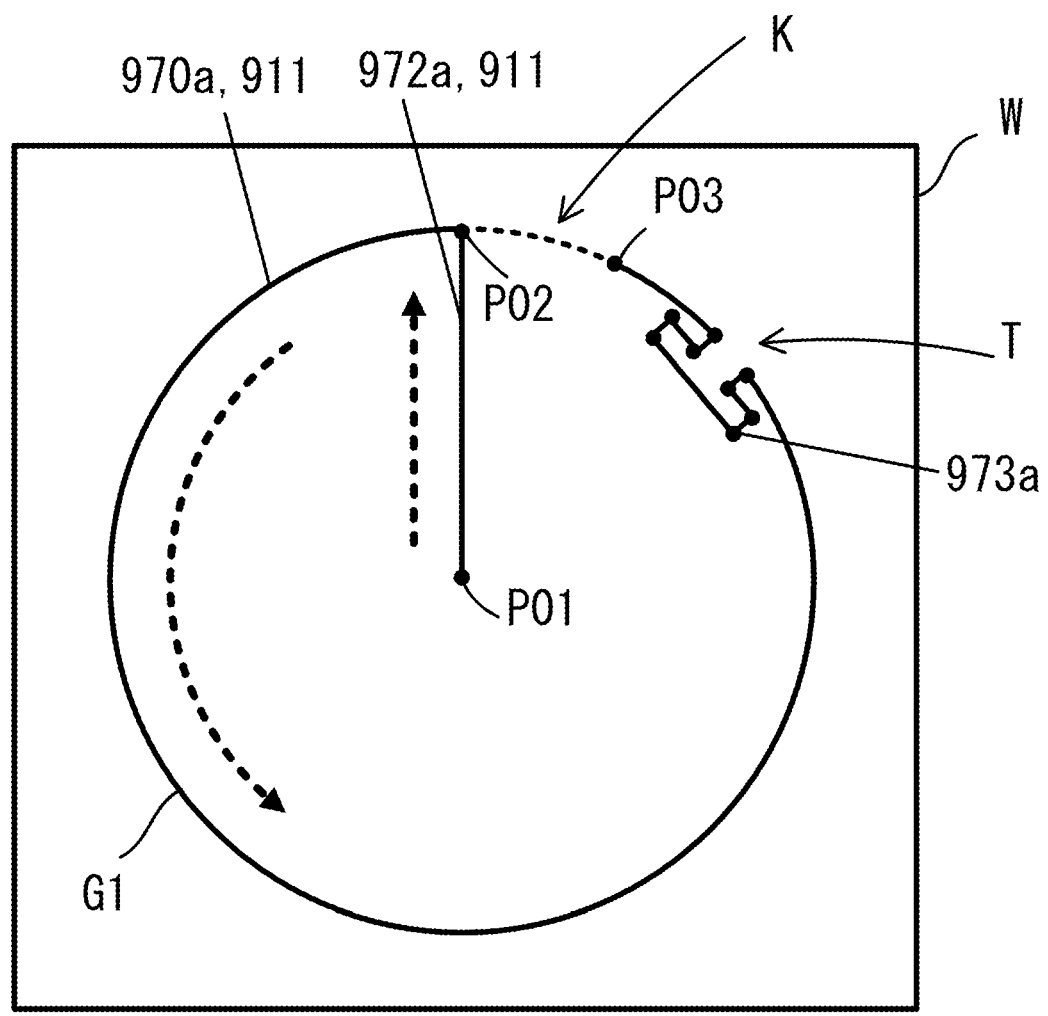
FIG. 5 is an illustrative diagram illustrating the first machining path 911 of the machining program 90 of the above embodiment.

The uncut part data 54 is data that defines the position where the uncut part K is provided. The uncut part K is a range set on the machining path 970a of the machining groove G1 so that the core N is not completely separated from the workpiece during roughing machining. Here, the uncut part K is set in the machining shape locus of the divided core Nx (the divided core N4 in FIG. 4) to be machined last among the divided cores Nx, and is set on the machining path of the machining groove G1 (FIG. 5).

The processing part 60 generates a machining program 90 based on the machining shape data 70 input from the input part 30 and various data stored in the storage part 50, and is configured by a storage data acquisition part 61, a weight calculation part 62, a division calculation part 63 and a machining program generating part 64.

The storage data acquisition part 61 acquires various data stored in the storage part 50.

The weight calculation part 62 calculates the shape data of the core N based on the machining shape data 70, calculates the volume of the core N, and calculates the weight of the core N based on the density data 52 of the workpiece W acquired by the storage data acquisition part 61. Further, though the weight data of the core N can be acquired by directly inputting it from the input part 30 by the operator who generates the machining program, according to the embodiment in which the weight calculation part 62 is provided, it is more advantageous in that the burden on the operator is reduced.

The division calculation part 63 calculates the number of divisions of the core N based on the weight of the core N acquired by the weight calculation part 62 and the data 51 indicating the correlation between and the weight and the number of divisions of the core N. The number of divisions is a number that can divide the core N into a size (shape and mass) that allows the core moving device 8 to securely hold the divided cores Nx, which form the inner part of the workpiece W, and to move them to the outside of the machine without dropping them into the machining tank.

The machining program generating part 64 generates the machining program 90 based on the machining shape data 70, the information on the number of divisions of the core N calculated by the division calculation part 63, the claw part data 53, and the uncut part data 54.

The machining program generating part 64 is a part that generates the machining program 90 for roughing machining (first cut) and finishing machining (second cut and subsequent cuts) of the machining groove G1, but here, it particularly describes the generation of the movement command for the wire electrode E during roughing machining.

Specifically, the machining program generating part 64 generates the machining program 90 which generates a first machining path 911 (FIG. 5) for forming the machining groove G1 with the uncut part K left, a second machining path 912 for separating the divided core Nx (FIG. 6), a third machining path 913 (FIG. 7) for cutting the uncut part K, and a fourth machining path 914 (FIG. 9) for separating and removing the claw part T added to the machining groove G1, and in which movement commands are given in the order of the first machining path 911, the second machining path 912, the third machining path 913, and the fourth machining path 914 during roughing machining.

The machining paths defined in the machining program 90 generated by the machining program generating part 64 include the machining path 970a of the machining groove G1, the machining paths 972a, 972b, 972c and 972d of the dividing line 72, and the machining path 973a, 973b and 973c of the claw part T, and further includes an approach route leading to the above machining paths.

FIG. 5 is an illustrative diagram illustrating the first machining path 911 of the machining program 90 of the disclosure.

The first machining path 911 is a path in which the wire electrode E moves from a machining start position P01 which is the center of gravity 71 of the core N to an approach point P02 on the machining groove G1 along the approach path corresponding to the machining path 972a of the dividing line 72, then moves from the approach point P02 on the machining path 970a of the machining groove G1 along the machining shape of the machining groove G1, then moves on the machining path 973a of the claw part T along the shape of the claw part T, and finally stops at a machining position P03, leaving the uncut part K (FIG. 5). In the example shown in FIG. 5, the uncut part K is shown in the range on the machining path along the machining shape of the machining groove G1 between the approach point P02 and the machining position P03.

The machining program generating part 64 adds the machining path 973a of the claw part T to the machining path 970a of the machining groove G1 based on the machining shape data 70, the claw part data 53, and the uncut part data 54, and generates the first machining path 911 in which the uncut part K is left at a position close to the machining path 973a of the claw part T.

Figure 6:
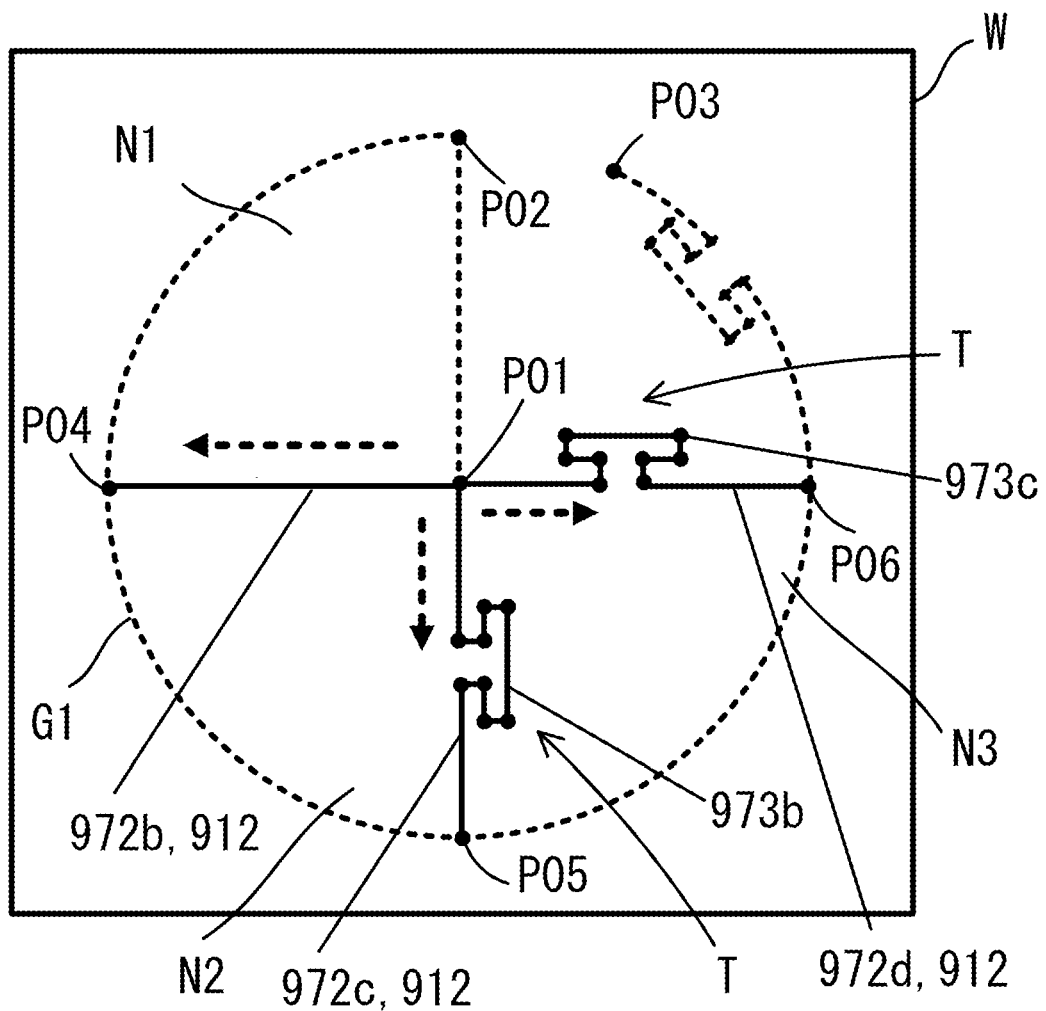
FIG. 6 is an illustrative diagram illustrating the second machining path 912 of the machining program 90 of the above embodiment.

FIG. 6 is an illustrative diagram illustrating the second machining path 912 of the machining program 90 of the disclosure.

The machining program generating part 64 generates the second machining path 912 which is a machining path for separating the divided cores Nx that divide the core N which forms the inner part of the workpiece W.

The machining program generating part 64 generates the second machining path 912 that equally divides the core N based on the center of gravity 71 of the core N so that the divided cores Nx have the same shape and the same mass based on the number of divisions of the core N calculated by the division calculation part 63. For example, in the machining example shown in FIG. 4, the second machining path 912 includes the machining paths 972b, 972c and 972d of the straight dividing line 72 that equally divides from the center of gravity 71 of the core N (FIG. 6).

When a plurality of divided cores Nx cannot be divided into equal parts to have the same shape corresponding to the shape of the core N, the machining program generating device 20 divides the plurality of divided cores Nx to have the same mass as much as possible based on the center of gravity 71 of the core.

Further, the machining program generating part 64 adds the machining paths 973b and 973c of the claw part T on the machining paths 972c and 972d of the dividing line 72 based on the claw part data 53 to generate the second machining path 912.

In the machining example shown in FIG. 6, the second machining path 912 is configured by three machining paths. The first machining path is a machining path in which the wire electrode E returns to the machining start position P01 and moves from the machining start position P01 to the machining position P04 on the machining groove G1 along the machining path 972b of the dividing line 72. The second machining path is a machining path in which the wire electrode E returns to the machining start position P01 again, moves from the machining start position P01 on the machining path 972c of the dividing line 72, moves on the machining path 973b of the claw part T along the shape of the claw part T on the way, then moves again on the machining path 972c of the dividing line 72 and stops at the machining position P05. The third machining path is a machining path in which the wire electrode E returns to the machining start position P01 again, moves from the machining start position P01 on the machining path 972d of the dividing line 72, moves on the machining path 973c of the claw part T along the shape of the claw part T on the way, then moves again on the machining path 972d of the dividing line 72 and stops at the machining position P06.

In this way, when the wire electrode E moves sequentially on the second machining path 912 along the first machining path, the second machining path, and the third machining path, the divided cores N1 and N2, N3 are sequentially separated from the machining groove G1 by the wire electrode E. Each time the divided cores N1, N2, and N3 are separated from the machining groove G1, they are collected by the core moving device 8. Even when the divided cores N2 and N3 are separated from the machining groove G1, they do not move in the direction of the space due to the function of the claw part T.

Figure 7:
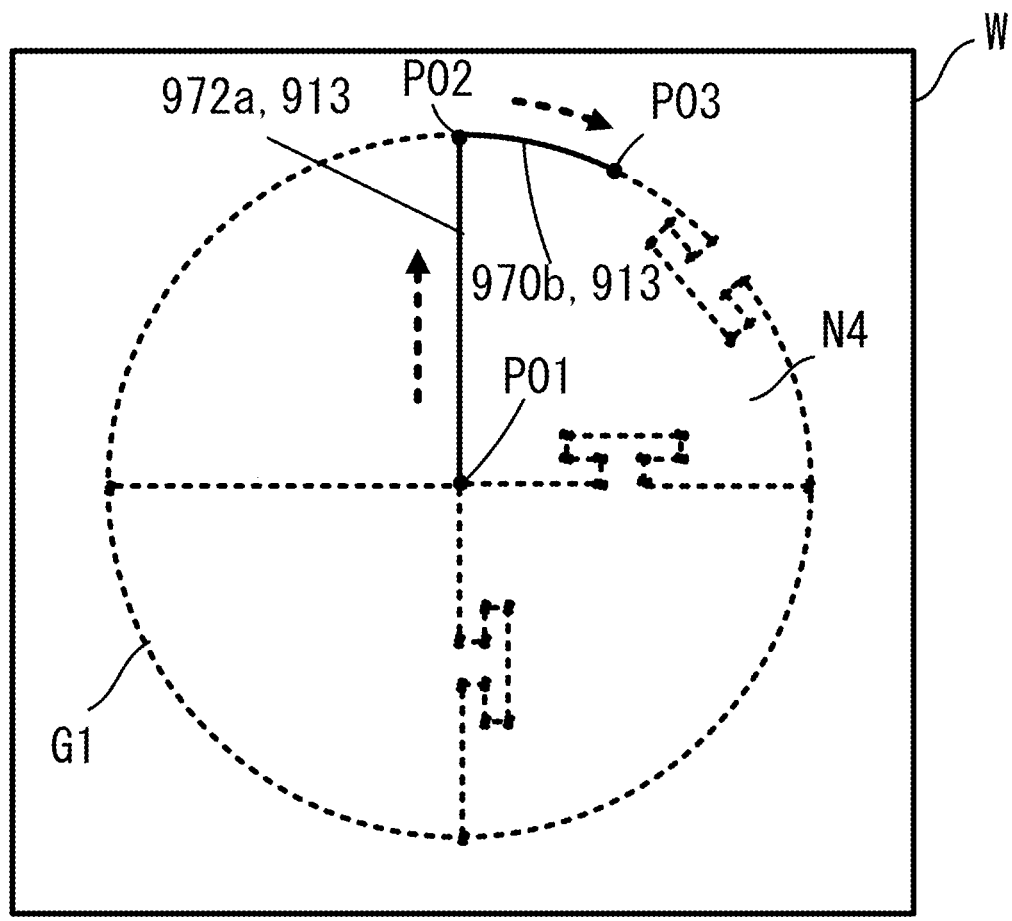
FIG. 7 is an illustrative diagram illustrating the third machining path 913 of the machining program 90 of the above embodiment.

FIG. 7 is an illustrative diagram illustrating the third machining path 913 of the machining program 90 of the disclosure.

The machining program generating part 64 generates the third machining path 913 for cutting the uncut part K based on the machining shape data 70 and the uncut part data 54.

In the machining example shown in FIG. 7, the third machining path 913 is a path in which the wire electrode E returns to the machining start position P01 which is the center of gravity 71 of the core N, moves from the machining start position P01 to the approach point P02 on the machining groove G1 along the approach path corresponding to the machining path 972a of the dividing line 72, moves from the approach point P02 on the machining path 970b of the uncut part K along the machining shape of the machining groove G1, and stops at the machining position P03.

When the wire electrode E moves on the third machining path 913, the divided core N4 is separated from the machining groove G1 by the wire electrode E. The separated divided core N4 is collected by the core moving device 8.

Figure 9:
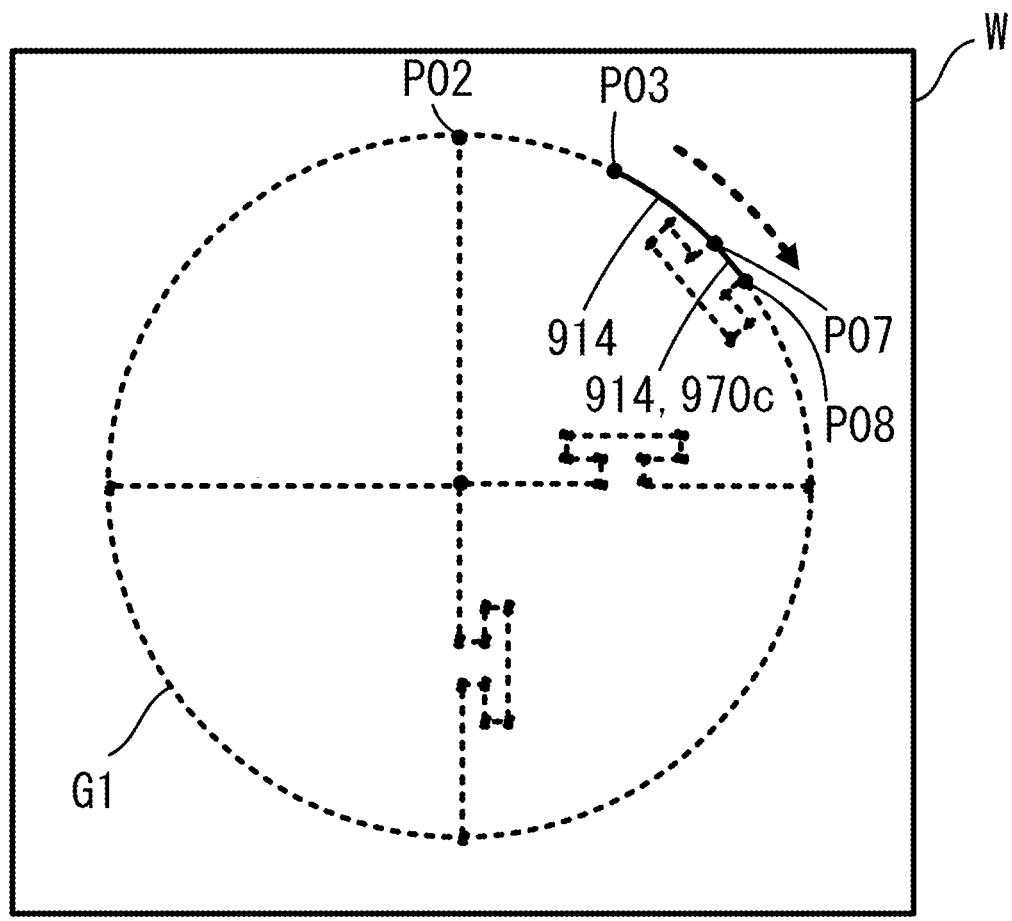
FIG. 9 is an illustrative diagram illustrating the fourth machining path 914 of the machining program 90 of the above embodiment.

FIG. 9 is an illustrative diagram illustrating the fourth machining path 914 of the machining program 90 of the disclosure.

The machining program generating part 64 generates the fourth machining path 914 that removes the claw part T unnecessary for the product left after separating all the divided cores Nx included in the core N based on the machining shape data 70 and the claw part data 53.

In the machining example shown in FIG. 9, the fourth machining path 914 is a path in which the wire electrode E moves from the machining position P03 which is the machining start position to the machining position P07 along the machining path 970a of the machining groove G1, then moves to the machining position P08 on the machining path along the machining shape of the machining groove G1, and stops. Here, the machining path 970c from the machining position P07 to the machining position P08 is a range in which the bottom of the claw part T is added on the machining path of the machining groove G1, and the claw part T can be removed by moving the wire electrode E along the machining path 970c. When the claw part T is to be removed, if it is not desirable to separate and drop the claw part T to remove it, the claw part T can be selectively removed by so-called coreless machining in which the claw part T is completely machined. The fourth machining path when performing coreless machining has a linear shape which, with the tip end side of the claw part T as the starting point, removes all the claw part T by machining, generated by a well-known method in coreless machining; however, regardless of whether the claw part T is separated or the claw part T is completely removed by machining, the fourth machining path is still the machining path for removing the claw part T.

(1.2 Overall Operation of the Wire Discharge Machining System 100)

Figure 10:
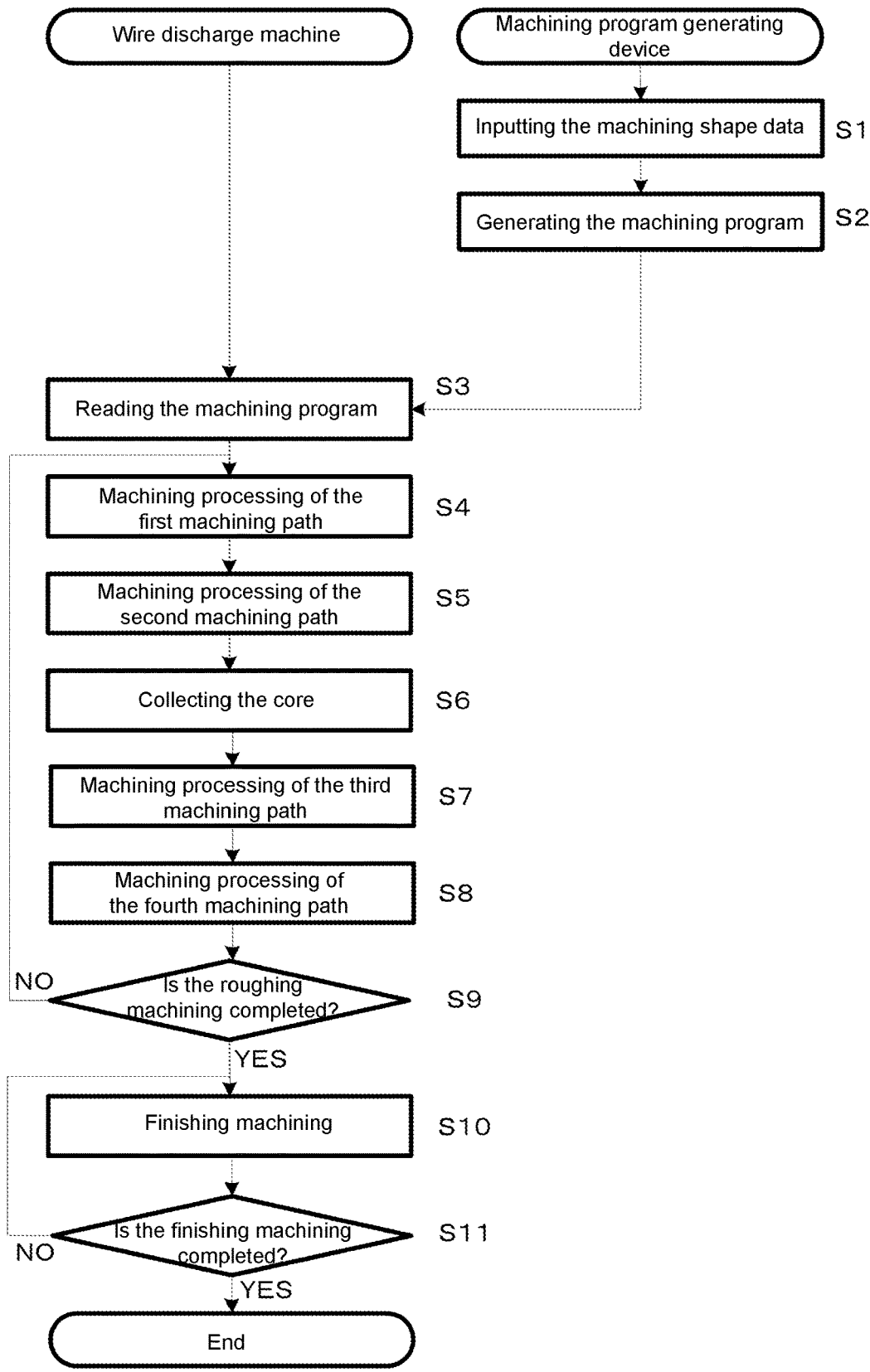
FIG. 10 is a flowchart showing an outline of the overall operation of the wire discharge machining system 100 of the above embodiment.

FIG. 10 is a flowchart showing an outline of the overall operation of the wire discharge machining system 100 of the disclosure. The outline of the overall operation of the wire discharge machining system 100 will be described with reference to the figure.

The machining program generating device 20 acquires the machining shape data 70 which is the machining shape of the actual product via the input part 30 (S1: input step). The machining program generating device 20 generates the machining program 90 based on the machining shape data 70, the information on the number of divisions of the core N calculated by the division calculation part 63, the claw part data 53, and the uncut part data 54 (S2: machining program generating step). In the step of generating the machining program 90, the machining program 90 that gives the movement commands of the first machining path 911, the second machining path 912, the third machining path 913, and the fourth machining path 914 as the machining paths during roughing machining is generated.

After that, the machining program generating device 20 transmits the machining program 90 to the wire discharge machine 10.

The control device 9 reads the machining program 90 transmitted from the machining program generating device 20 (S3), decodes it, and generates a control signal.

The control device 9 operates each shaft motor 6 and the power supply device 7 according to the generated control signal, and performs roughing machining while supplying machining fluid from the jet nozzles 22 and 32 to the machining gap between the workpiece W and the core N. As a specific example, the control device 9 moves the wire electrode E to machine the machining groove G1 and the claw part T added to the machining groove G1 along the first machining path 911 (S4; FIG. 5: first machining processing). Since the workpiece W and the core N are joined by the uncut part K and the claw part T, the core N in the machining groove G1 does not fall even after the machining processing of the first machining path 911 is completed.

Next, the control device 9 repeatedly performs hollowing machining in which the core N is sequentially divided and separated from the workpiece W while forming the claw part T along the second machining path 912 (S5: second machining processing). Each time the divided core Nx divided from the workpiece W is separated, the core moving device 8 is driven, and the divided core N is taken out from the workpiece W, and the divided core N is collected in the core collection bucket (S6).

In the middle of the roughing machining step, since the claw part T formed on the dividing line 72 and the divided core N engage with each other, the uncollected core N does not move or fall into the space created by removing the core N from the workpiece W, and remains inside the machining groove G1.

Then, the wire electrode E is moved along the third machining path 913 to perform hollowing machining for cutting off the uncut part K (S7: third machining processing). Even after the uncut part K is cut off, since the claw part T formed on the machining groove G1 and the divided core Nx engage with each other, the divided core Nx does not move or fall into the space created by removing the divided core Nx from the workpiece W, and remains inside the machining groove G1. The core moving device 8 is driven, the divided core Nx is taken out from the workpiece W, and the divided core Nx is collected in the core collection bucket.

Finally, the wire electrode E is moved along the fourth machining path 914 to separate the claw part T added to the machining groove G1 (S8: fourth machining processing).

When the roughing machining is completed, the finishing machining is executed (S9, S10). In the finishing machining, the machining groove G1 is finished to produce a machined object which is the actual product.

Then, it is determined whether or not the finishing machining is completed (S1), and the execution of the machining program 90 is completed.

When the outer circumference of the core N is machined by the first machining path 911 in this way, since the workpiece W and the core N are joined by the uncut part K and the claw part T, even if the machining processing of the first processing path 911 is completed, the core N in the machining groove G1 does not fall, and the subsequent division processing can be performed. Further, since most of the machining of the machining groove G1 is performed in advance in a state where the core N has never been collected from the workpiece W, compared with the case where the machining shape is machined in a state where the jet of the machining fluid is concentrated in the space after the divided core N is collected, it is possible to prevent the problem that the machining chips are clogged in the machining gap and the insulation state between the wire electrode E and the workpiece W is deteriorated.

Further, in the above embodiment, the case where the workpiece W is machined in two stages of roughing machining and finishing machining has been described, but the machining may be completed at more machining stages or only by roughing machining, and the operation of removing the claw part T provided on the workpiece W side may be performed at any timing.

(1.3 Method of Generating a Machining Program of the Machining Program Generating Device 20)

Figure 14:
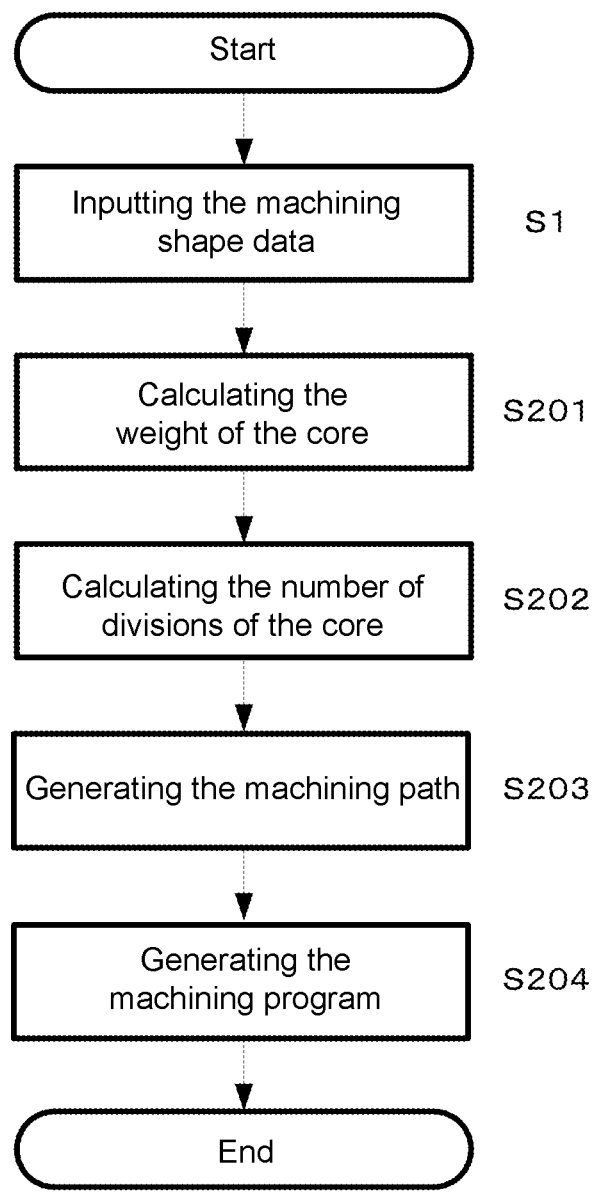
FIG. 14 is a flowchart for illustrating a method of generating a machining program by the machining program generating device 20.

FIG. 14 is a flowchart for illustrating a method of generating a machining program by the machining program generating device 20.

The machining program generating device 20 acquires the machining shape data 70 via the input part 30 (S1). The machining shape data 70 may be input by an operation of the operator, or may be input by being connected to a CAD device (not shown).

Then, the weight calculation part 62 calculates the shape data of the core N based on the machining shape data 70, calculates the volume of the core N, and calculates the weight of the core N based on the density data 52 of the workpiece W acquired by the storage data acquisition part 61 (S201). Further, the division calculation part 63 calculates the number of divisions of the core N based on the weight of the core N acquired by the weight calculation part 62 and the data 51 indicating the correlation between the weight and the number of divisions of the core N (S202).

After that, the machining program generating part 64 generates the first machining path 911 for forming the machining groove G1 with the uncut part K left, the second machining path 912 for separating the divided core Nx, the third machining path 913 for cutting the uncut part K, and the fourth machining path 914 for separating and removing the claw part T added to the machining groove G1 based on the machining shape data 70, the information on the number of divisions of the core N calculated by the division calculation part 63, the claw part data 53, and the uncut part data 54 (S203).

Then, the machining program generating part 64 generates the machining program 90 in which movement commands are given in the order of the first machining path 911, the second machining path 912, the third machining path 913, and the fourth machining path 914 during roughing machining (S204).

In the embodiment, the number of divisions of the core N is calculated by the division calculation part 63 using the weight of the core N acquired by the weight calculation part 62, but the number of divisions of the core N may be set by the operator via the input part 30. In that case, the weight calculation part 62 and the division calculation part 63 can be omitted.

Further, the disclosure is not limited to the above-described embodiments, and it goes without saying that various application implementations or modifications can be implemented as needed.

INDUSTRIAL APPLICABILITY

The wire discharge machine of the disclosure contributes to a good improvement in machining accuracy and machining efficiency even when the core is divided during machining.

What is claimed is:

1. A machining method of a wire discharge machine, comprising:
 a processing of forming and machining a claw part on at least one of a first machining path of a machining groove and a second machining path of a dividing line for dividing a core that forms an inner part of a workpiece separated by the machining groove, wherein the claw part has a triangular cross section, a hook cross section, a convex cross section, or a trapezoidal cross section; and
 a processing of separating the core from the workpiece by dividing at the dividing line.

2. The machining method of the wire discharge machine according to claim 1, comprising:
 a first machining processing of machining the machining groove with an uncut part left so as not to separate the core from the workpiece;
 a second machining processing of dividing at the dividing line and separating the core from the workpiece in order; and
 a third machining processing of separating the uncut part.

3. The machining method of the wire discharge machine according to claim 2, wherein the second machining processing forms the claw part on the second machining path of the dividing line and machines the claw part and the dividing line.

4. The machining method of the wire discharge machine according to claim 2, wherein the first machining processing forms the claw part on the first machining path of the machining groove.

5. The machining method of the wire discharge machine according to claim 4, after the third machining processing, further comprising:
 a fourth machining processing of removing the claw part from the workpiece.

* * * * *